D. F. REGAN.
HOSE HOLDER.
APPLICATION FILED MAR. 31, 1910.
973,810.
Patented Oct. 25, 1910.
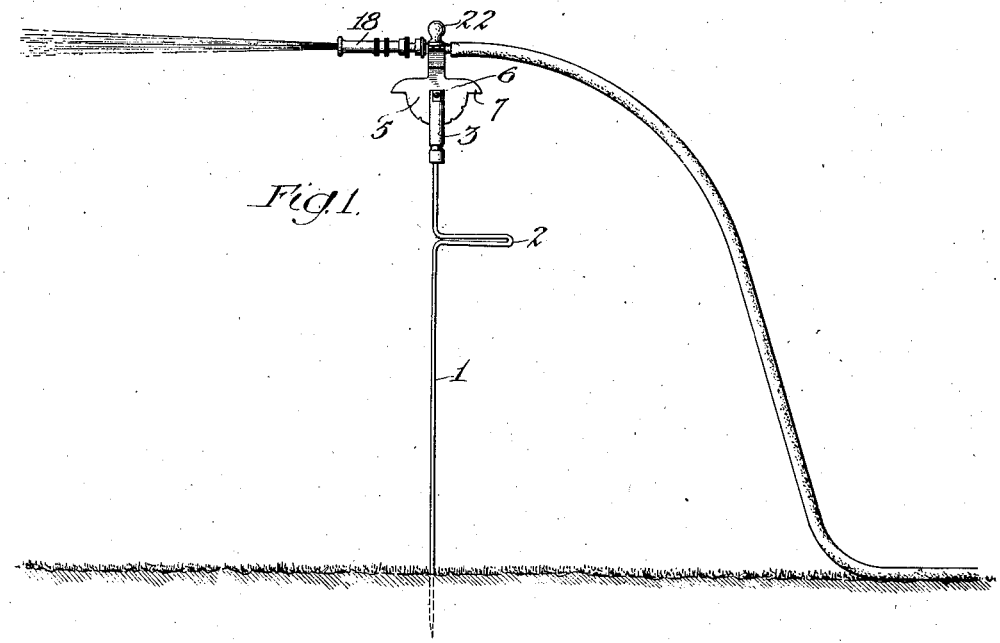
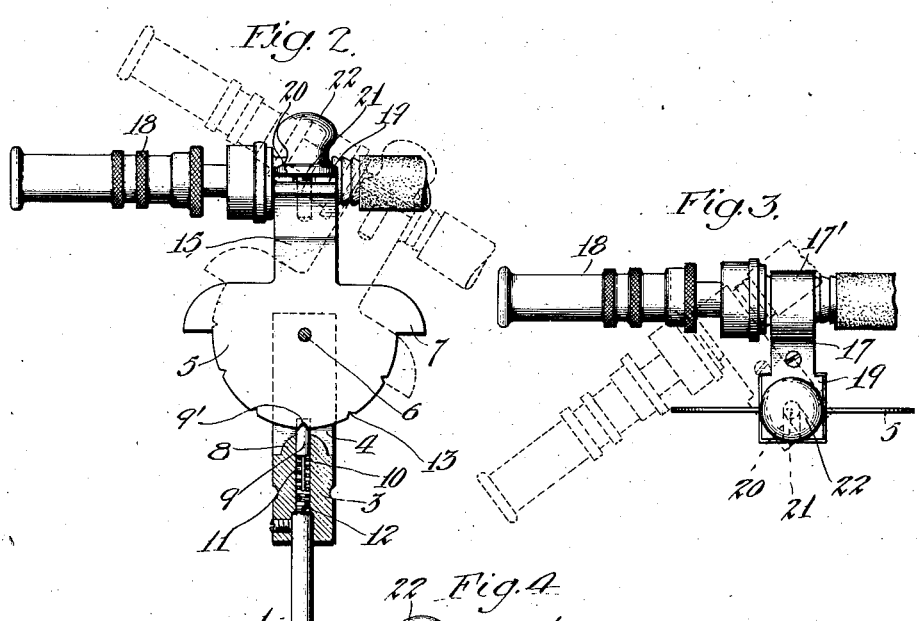
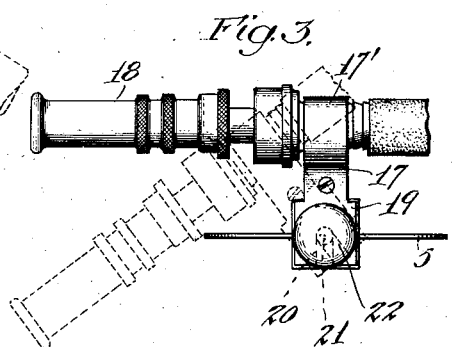
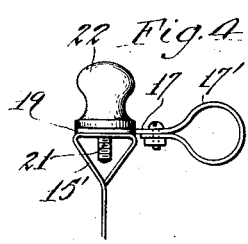
Witnesses:
Inventor:
Daniel F. Regan,
by Townsend & Hackley
attys.

UNITED STATES PATENT OFFICE.

DANIEL F. REGAN, OF LOS ANGELES, CALIFORNIA.

HOSE-HOLDER.

973,810.  Specification of Letters Patent.  Patented Oct. 25, 1910.

Application filed March 31, 1910. Serial No. 552,725.

*To all whom it may concern:*

Be it known that I, DANIEL F. REGAN, a citizen of the United States, residing at Los Angeles, in the county of Los Angeles, State of California, have invented a new and useful Hose-Holder, of which the following is a specification.

This invention relates to a holder for a garden hose whereby the hose can be supported in any desired position and can be turned in different directions and at different elevations or angles of inclination to the horizontal.

The main object of the invention is to provide a device for this purpose which will be simple and cheap in construction and efficient in operation.

Other objects of the invention will appear hereinafter.

The accompanying drawings illustrate the invention, and referring thereto—

Figure 1 is a side elevation of the hose holder with the hose supported thereon. Fig. 2 is a vertical section of the holder. Fig. 3 is a plan thereof. Fig. 4 is an end elevation of the hose attaching means.

The holder comprises a rod or post 1 preferably of steel wire bent or doubled on itself as at 2 to form a handle for manipulation thereof and provided at its upper end with means for adjustably supporting the hose. A head 3 fastened on the upper end of the rod 1 is vertically slotted as at 4 to receive a segment plate 5 which is pivoted to said head at 6 and may be substantially semicircular in form with a radial projection 7 at each end to engage with a boss 8 on the head 3 to limit the angular movement of said plate on said head, and a spring catch is provided engaging with the peripheral portion of this plate, said catch comprising a head 9 sliding in a vertical recess 10 in the head 3 and pressed upwardly by a spring 11 within said recess, said spring being engaged by a screw plug 12 screwing into the lower portion of said recess, said head 9 having a wedge shaped upper end 9' adapted to engage in any one of a series of V-shaped notches 13 in the peripheral portion of the plate 5. An arm 15 extending upwardly from the plate 5 is bent in the form of an inverted triangle as shown at 15', the flat top of this triangle being used for attachment of a clip or clamp 17 for supporting the hose, said clip being provided with a hook or ring portion 17' adapted to engage around a portion of the hose nozzle indicated at 18, and being provided with a shank 19 having a slot 20 to receive a fastening screw 21 having a head or knob 22, said screw engaging in the portion 15' of the arm 15 to hold the hose clip firmly in position on said arm.

The device is used as follows: The post or rod 1 is stuck into the ground in the required position and the hose is then brought to the proper elevation or angle of inclination by simple turning the device on the pivot 6, the spring catch means 9, 11 yielding in this operation so as to allow the hose to be turned to the proper angular position without necessitating the unlocking or release of any catch devices. The catch means being in frictional engagement allows the hose to be turned with only a frictional resistance and snaps into position to hold the hose in the position to which it is set.

What I claim is:

1. A hose holder comprising a supporting rod provided with a head, said head being vertically slotted, a segmental plate pivotally mounted on said head within said slot, said plate having peripheral spring catch means frictionally engaging with the peripheral portion of said plate, and an arm on said plate provided with means for attachment of the hose thereto, said attaching means comprising a clip member extending laterally over said arm, and detachably secured thereto, said clip member formed with a loop adapted to surround and support a hose nozzle.

2. A hose holder comprising a supporting rod provided with a head, said head being vertically slotted, a segmental plate pivotally mounted on said head within said slot, said plate having peripheral notches, spring catch means frictionally engaging with the peripheral portion of said plate, and an arm on said plate provided with means for attachment of the hose thereto, said plate having a radial projection at each end of its peripheral portion adapted to engage the aforesaid head to limit angular motion of the plate.

In testimony whereof, I have hereunto set my hand at Los Angeles, California this 25th day of March 1910.

DANIEL F. REGAN.

In presence of—
G. T. HACKLEY,
P. J. FLANAGAN.